United States Patent [19]

Garwood et al.

[11] 4,413,153
[45] Nov. 1, 1983

[54] INTEGRATED PROCESS FOR MAKING TRANSPORTATION FUELS AND LUBES FROM WET NATURAL GAS

[75] Inventors: William E. Garwood, Haddonfield; Wooyoung Lee, Cherry Hill, both of N.J.

[73] Assignee: Mobil Oil Corporation, New York, N.Y.

[21] Appl. No.: 436,158

[22] Filed: Oct. 22, 1982

[51] Int. Cl.$^3$ ............................................. C07C 1/04
[52] U.S. Cl. .................................. 585/304; 585/310; 585/312; 585/314; 585/315; 585/322; 585/408; 585/469; 585/640; 585/733; 518/703; 518/704; 518/707
[58] Field of Search ............... 585/315, 314, 322, 324, 585/408, 469, 639, 640, 739, 302, 304, 310, 312; 518/701, 702, 703, 704, 705, 706, 707; 208/80

[56] References Cited

U.S. PATENT DOCUMENTS

| 2,683,121 | 7/1954 | Vincent | 518/703 |
| 2,683,152 | 7/1954 | Dickinson | 518/704 |
| 3,760,024 | 9/1973 | Cattanach | 585/415 |
| 4,100,218 | 7/1978 | Chen et al. | 585/315 |
| 4,120,910 | 10/1978 | Chu | 585/417 |
| 4,157,293 | 1/1979 | Plank et al. | 585/417 |

FOREIGN PATENT DOCUMENTS 2357756 11/1973 Fed. Rep. of Germany ...... 518/702

Primary Examiner—Delbert E. Gantz
Assistant Examiner—A. Pal
Attorney, Agent, or Firm—Michael G. Gilman; Charles J. Speciale; Lowell G. Wise

[57] ABSTRACT

The synthetic fuel slate of products derived from wet natural gas is expanded to include both aromatic gasoline from the methane rich dry gas portion via steam reforming to synthesis gas, the production of methanol from synthesis gas and the conversion of methanol to gasoline over a ZSM-5 type catalyst, plus high quality jet fuel, diesel fuel and lubricating oils from the $C_3{}^+$ paraffin rich fraction of wet natural gas via thermal cracking of the paraffin rich fraction to olefins and the conversion of the olefins to gasoline and distillate boiling range hydrocarbons over a ZSM-5 type catalyst. Methane separated from the thermal cracked product can be mixed with the dry gas fraction for synthesis gas production and a portion of the hydrogen from the synthesis gas may be used to hydrogenate the distillate fraction from the catalytic conversion of the thermal cracked product.

10 Claims, 1 Drawing Figure

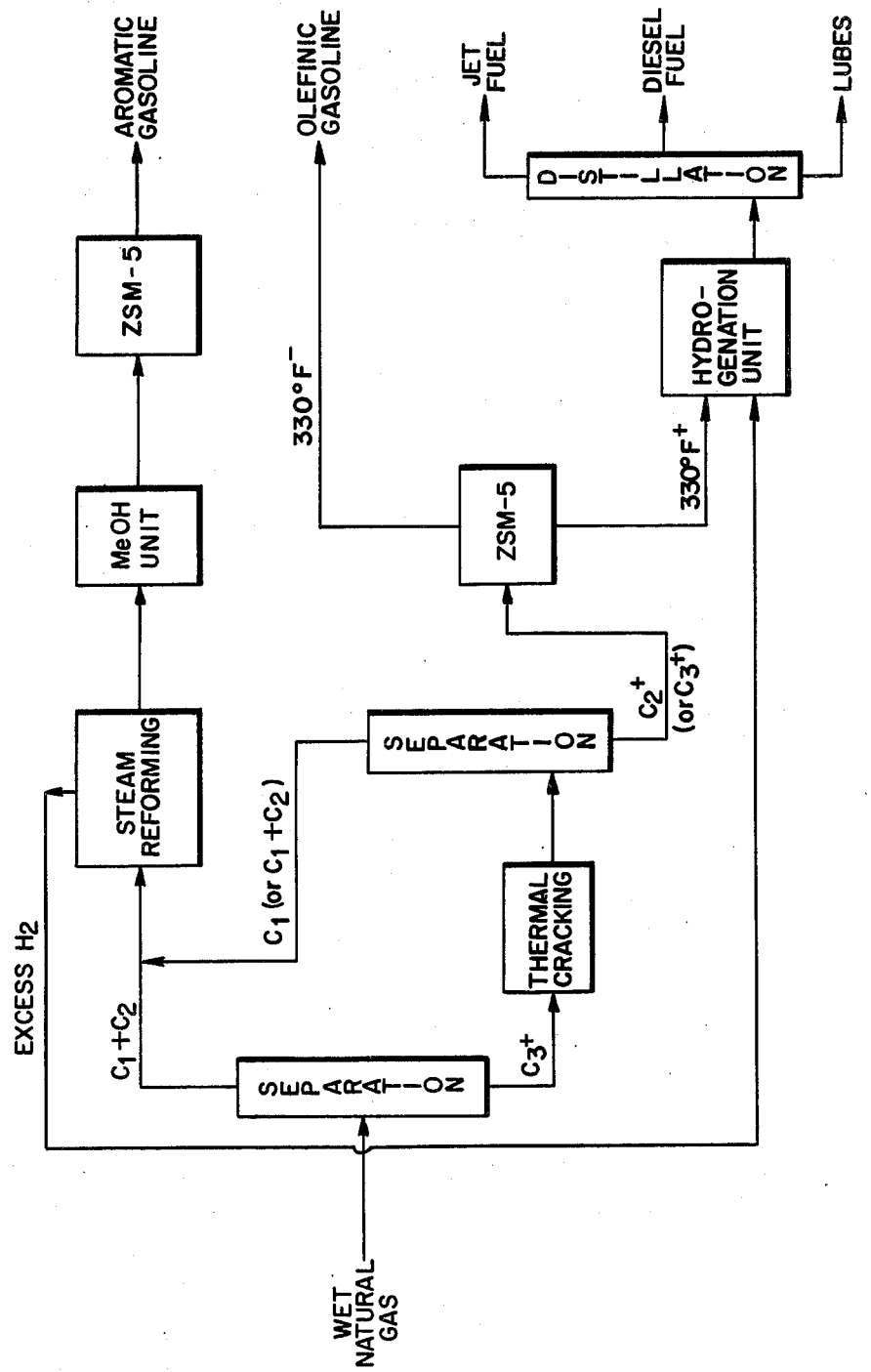

INTEGRATED PROCESS FOR MAKING TRANSPORTATION FUELS AND LUBES FROM WET NATURAL GAS

BACKGROUND OF THE INVENTION

1. Field of the Invention

This invention relates to manufacturing synthetic fuels and petrochemicals. The invention more particularly relates to a process of expanding the product slate obtainable from the conversion of wet natural gas.

2. Description of the Prior Art

It is established that relatively low molecular weight aliphatic organic compounds, containing up to 8 carbon atoms in the longest hydrocarbon chain and containing at least one oxygen, sulfur or halogen heteroatom can be converted to very high quality gasoline boiling-range hydrocarbon materials. These heteroatom-substituted lower aliphatics are exemplified by alcohols, ethers, mercaptans, thioethers, carbonyls, thiocarbonyls, amines, amides and alkyl halides. The conversion of such heteroatom-containing materials to high quality gasoline boiling-range hydrocarbons is accomplished by contacting such materials alone or in admixture with each other in pure or impure state with a crystalline aluminosilicate zeolite catalyst having a silica to alumina mole ratio of at least about 12, a constraint index as defined below of about 1 to 12 and preferably a crystal density not substantially below 1.6 grams per cubic centimeter. Zeolite ZSM-5 is an example of such a catalyst. Conversion is typically accomplished at about 400° to 1000° F. Reference is made to U.S. Pat. Nos. 3,894,107; 3,894,106 and 3,907,915, the entire contents of which are incorporated herein by reference, including the references therein to illustrate zeolite catalysts.

Typical natural gas consists of hydrocarbons having a low boiling point. Methane makes up approximately 85 percent of the typical gas. Ethane is likely to be present in amounts up to 10 percent and propane up to 3 percent. Butane, pentane, hexane, heptane and octane may also be present. Whereas normal hydrocarbons having 5–10 carbon atoms are liquid at ordinary temperatures and pressures, these paraffins of higher molecular weight are present in natural gas in vapor form. Types of natural gas vary according to composition to result in a dry or lean (mostly methane) gas, wet gas which contains considerable amounts of the higher molecular weight paraffins, residue gas from which higher paraffins have been extracted and casing head gas which is derived from an oil well by extraction at the surface. Natural gas occurs in porous rock with or near accumulation of crude oil, and is always present to some extend wherever oil has been found.

In conventional processing, wet natural gas is subjected to a separation in which a $C_5+$ fraction, called natural gas liquid, is removed leaving a residue gas which is then conventionally separated into a $C_1/C_2$ dry gas fraction and a $C_3/C_4$ LPG fraction.

It is conventional to convert the dry gas fraction to methanol or a mixture of alcohols. This is achieved by first steam reforming the dry gas portion of produce a synthesis gas. Steam reforming comprises reacting the dry gas portion with steam in the presence of a nickel catalyst in a closed reaction zone at a temperature within the range of about 1400° to 1700° F. and at a reaction zone pressure generally about 0 to 30 psiq. The product from steam reforming is a synthesis gas comprising carbon monoxide and hydrogen. The synthesis gas is then converted to methanol by passing the product gas over a methanol synthesis catalyst. Such a catalyst contains zinc and/or copper. Methanol synthesis operates at about 350° to 600° F. and 700 to 2500 psig.

As noted above, processes have been developed for converting methanol or heteroatom-containing lower aliphatics to high quality gasoline. Thus, it has been known to convert the dry gas to high quality, highly aromatic gasoline by combining the preceding process steps.

It has further been proposed to increase the gasoline production from natural gas by converting more of the natural gas than just the dry gas portion to gasoline. U.S. Pat. No. 3,965,205 discloses a process in which $C_5+$ natural gas liquids are mixed with methanol which has been formed from the dry gas portion and the mixture converted over ZSM-5 to gasoline. However, the product is limited to gasoline boiling-range hydrocarbons. It would be desirable to expand the slate of products which are derived from wet natural gas to include a wide slate of transportation fuels, lubes and other petrochemicals.

It is therefore an important object of this invention to convert more of the natural gas than just the dry gas portion to gasoline.

It is another object of this invention to convert natural gas to a wide slate of transportation fuels including gasoline, jet fuel and diesel fuel and petrochemical products including lubricating oil.

Other additional objects of this invention will become apparent from a consideration of this entire specification including the claims and the drawing hereof.

SUMMARY OF THE INVENTION

In accordance with the present invention wet natural gas is converted to a wide slate of transportation fuels and lubricating oils by separating the natural gas into a $C_1/C_2$ dry gas fraction and $C_3+$ paraffin rich fraction and integrating the conversions of each of the separated fractions into a wide slate of transportation fuels and petrochemicals. The dry gas fraction is converted to an aromatic gasoline via the successive process steps of steam reforming to a synthesis gas of carbon monoxide and hydrogen, converting the synthesis gas to methanol and converting the methanol to an aromatic gasoline over a ZSM-5 type catalyst. The paraffin rich fraction is converted to gasoline, distillate and lubricating oil via the successive process steps of thermal cracking the paraffin rich fraction to olefins and converting the $C_3+$ olefin fraction of the thermal cracked product to gasoline and distillate hydrocarbons over a ZSM-5 type catalyst. The separate conversions of the dry gas and paraffin rich natural gas fractions can be integrated whereby a portion of the $C_1/C_2$ product from thermal cracking the paraffin rich fraction can be recycled to the steam reformer and excess hydrogen from steam reforming the dry gas portion can be used to hydrogenate the distillate produced from the conversion of the $C_3+$ olefins over ZSM-5.

It is an important aspect of this invention that the product yield from natural gas is more varied than the mere gasoline product which heretofore has been a limitation of synthetic fuel production from natural gas.

Understanding of this invention will be facilitated by reference to the accompanying drawing, the single FIGURE of which is a block flow diagram of a representative process configuration according to this invention.

DETAILED DESCRIPTION OF THE INVENTION

A novel aspect of the present invention resides in the combination of steps involved in producing a wide slate of transportation fuels and lubrication oils from separate fractions of wet natural gas. Referring to the FIGURE, wet natural gas is first separated into a $C_1/C_2$ dry gas fraction and a $C_3+$ paraffin rich bottom fraction. The separate fractions from the wet natural gas feedstock are treated individually. The dry gas fraction is converted to gasoline by first steam reforming the dry gas to a synthesis gas comprising carbon monoxide and hydrogen and subsequently converting the synthesis gas to methanol. The methanol product is converted to an aromatic gasoline over a specific type of crystalline zeolite catalyst. The $C_3+$ paraffin rich fraction is converted to olefinic gasoline, distillate and lubricating oil by thermal cracking the separated paraffin fraction to olefins and converting the bottoms ($C_2+$ or $C_3+$) olefin fraction from the thermal cracker over a specific type of crystalline zeolite catalyst to yield an olefinic gasoline product boiling below 330° F. and a 330° F. + distillate fraction. The distillate fraction is subject to hydrogenation to stabilize the distillate and improve cetane value. Upon distillation, the hydrotreated distillate can be separated into jet fuel, diesel fuel and a lubricating oil. gas fractions are preferably integrated into a combined process in which products formed by the conversion of one fraction are advantageously used in the other. For example, a portion of the $C_1/C_2$ product formed during thermal cracking of the paraffin rich fraction can be recycled to the steam reformer for eventual conversion to methanol and aromatic gasoline with the dry gas fraction of the wet natural gas feed. Likewise, excess hydrogen formed during steam reforming of the dry gas fraction can be used to hydrogenate the 330° F.+ distillate product formed in the catalytic conversion of the olefinic $C_3+$ thermal cracked product.

In accordance with the present invention, the methanol produced from the dry gas fraction and the $C_2+$ or $C_{3+}$ olefinic product obtained from thermal cracking the paraffin rich fraction are each brought separately into contact with a catalyst comprising a crystalline aluminosilicate zeolite having a silica to alumina ratio of at least about 12 and a constraint index within the approximate range of 1 to 12. Non-limiting examples of useful crystalline aluminosilicate zeolites include ZSM-5, ZSM-11, ZSM-12, ZSM-23, ZSM-35 and ZSM-38.

The synthesis and characteristics of zeolite ZSM-5 are described in U.S. Pat. No. 3,702,886, issued Nov. 14, 1972, the disclosure of which is incorporated herein by reference.

The synthesis and characteristics of zeolite ZSM-11 are described in U.S. Pat. No. 3,709,979, issued Jan. 9, 1973, the disclosure of which is incorporated herein by reference.

The synthesis and characteristics of zeolite ZSM-12 are described in U.S. Pat. No. 3,832,449, issued Aug. 27, 1974, the disclosure of which is incorporated herein by reference.

The synthesis and characteristics of zeolite ZSM-23 are described in U.S. Pat. No. 4,076,842, the entire contents of which are herein incorporated by reference.

The synthesis and characteristics of zeolite ZSM-35 are described in U.S. Pat. No. 4,016,245, issued Apr. 5, 1977, the disclosure of which is incorporated herein by reference.

The synthesis and characteristics of zeolite ZSM-38 are described in U.S. Pat. No. 4,046,849, the entire contents of which are herein incorporated by reference.

Although the zeolites described above have unusually low alumina contents, i.e., high silica to alumina ratios, they are very active even when the silica to alumina ratio exceeds 30. The activity is surprising since catalytic activity is generally attributed to framework aluminum atoms and cations associated with these aluminum atoms. These catalysts retain their crystallinity for long periods in spite of the presence of steam and high temperature which induces irreversible collapse of the framework of other zeolites, e.g., of the X and A type. Furthermore, carbonaceous deposits when formed, may be removed by burning at higher than usual temperature to restore activity. In many environments the zeolites of this class exhibit very low coke forming capability, conductive to very long times on stream between burning regenerations.

An important characteristic of the crystal structure of the zeolites for use herein is that they provide constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type catalysts useful in this invention possess, in combination: a silica to alumina ratio of at least about 12; and a structure providing constrained access to the crystalline free space.

The silica to alumina ratio referred to may be determined by conventional analysis. This ratio is meant to represent as closely as possible, the ratio in the rigid anionic framework of the zeolite crystal and to exclude aluminum in the binder or in cationic or other form within the channels. Although catalysts with a silica to alumina ratio of at least 12 are useful, it is preferred to use catalysts having higher ratios of at least about 30. Such catalysts, after activation, acquire an intracrystalline sorption capacity for normal hexane which is greater than that for water, i.e., they exhibit "hydrophobic" properties. It is believed that this hydrophobic character is advantageous in the present invention.

The type of zeolites useful in this invention freely sorb normal hexane and have a pore dimension greater than about 5 Angstoms, or, if elliptical in pore shape, at least the size of the pores in ZSM-5. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section of normal hexane is excluded and the zeolite is not of the desired type. Windows of 10-membered rings are preferred, although, in some instances, excessive puckering or pore blockage may render these catalysts ineffective. Twelve-membered rings do not generally appear to offer sufficient constraint to produce the advantageous conversions. Also, structures can be conceived due to pore blockage or other cause, that may be operative.

Rather than attempt to judge from the crystal structure whether or not a catalyst possesses necessary constrained access, a simple determination of the "constraint index" may be made by passing continuously a mixture of an equal rate of normal hexane and 3-methylpentane over a small sample, approximately 1 gram or less of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1000° F. for at least 15 minutes. The catalyst is then flushed with helium and the temperature adjusted between 500° and 950° F. to give an overall conversion between 10 and 60%. The mixture of hydrocarbons is passed at 1 liquid hourly space velocity (i.e., 1 volume of liquid hydrocarbon per volume of catalyst per hour) over the catalyst with the helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the crcking rate constants for the two hydrocarbons. Catalysts suitable for the present invention are those having a constraint index in the approximate range of 1 to 12. Constraint Index (CI) values for some typical catalysts, including those useful herein, are:

| Crystalline Aluminosilicate | CI |
|---|---|
| ZSM-5 | 8.3 |
| ZSM-11 | 8.7 |
| ZSM-12 | 2 |
| ZSM-23 | 9.0 |
| ZSM-35 | 2 |
| ZSM-38 | 2 |
| Beta | 0.6 |
| ZSM-4 | 0.5 |
| H—Zeolon | 0.5 |
| REY | 0.4 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 550° to 950° F., with accompanying conversion between 10 and 60%, the constraint index may very within the indicated approximate range of 1 to 12. Likewise, other variables such as the crystal size of the zeolite, the presence of possibly occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with the probability, in some instances, of compounding variable extremes. However, in all instances, at a temperature within the above-specified range of 550° to 950° F., the constraint index will have a value for any given zeolite of interest herein within the approximate range of 1 to 12.

The specific zeolites described, when prepared in the presence of organic cations, are catalytically inactive, possibly because the intracrystalline free space is occupied by organic cations from the forming solution. They may be activated by heating, for example, in an inert atmosphere at 1000° F. for 1 hour, followed by base exchange with ammonium salts and by calcination at 1000° F. in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1000° F. for from about 15 minutes to about 24 hours.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12, ZSM-23, ZSM-35 and ZSM-38, with ZSM-5 particularly preferred.

In a preferred aspect of this invention, the catalysts hereof are selected as those having a crystal framework density, in the dry hydrogen form, of not substantially below about 1.6 grams per cubic centimeter. It has been found that zeolites which satisfy all three of these criteria are most desired for the present process. Therefore, the preferred catalysts of this invention are those having a constraint index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper, the entire contents of which are incorporated herein by reference, is included in "Proceedings of the Conference on Molecular Sieves, London, April, 1967," published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal, or in mercury under pressure (mercury porosimeter). It is possible that the unusual sustained activity and stability of this class of zeolite is associated with its high crystal anionic framework density of not less then about 1.6 grams per cubic centimeter. This high density, of course, must be associated with a relatively small amount of free space within the crystal, which might be expected to result in more stable structures. This free space, however, is important as the locus of catalytic activity.

Crystal framework densities of some typical zeolites are:

|  | Void | Framework |
|---|---|---|
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ionic exchange and calcination of the ammonium form to yield the hydrogen form. In addition to the hydrogen form, other forms of the zeolite wherein the original alkali metal has been replaced by ion exchange with any of the cations of the metals of Groups I through VIII. However, in the case of Group IA metals, the cation content should in no case be so large as to substantially eliminate the activity of the zeolite for the catalysis being employed in the instant invention. For example, a completely sodium exchanged HZSM-5 appears to be largely inactive for shape selective conversion required in the present invention.

In practicing the desired conversion process, it may be desirable to incorporate the above-described crystalline aluminosilicate zeolite in another material resistant to the temperature and other conditions employed in the process. Such matrix materials include synthetic or naturally occurring substances as well as inorganic materials such as clays, silica and/or metal oxides. The latter may be either naturally occurring or in the form of gelatinous precipitates or gels including mixtures of silica and metal oxides. Naturally occurring clays which can be composited with the zeolite can include those of the montmorillonite and kaolin families, which families include the sub-bentonites and kaolins commonly known as Dixie, McNamee-Georgia and Florida clays or other in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, silica-titania, as well as ternary compositions, such as silica-alumina-thoria, silica-alumina-zirconia, silica-alumina-magnesia, and silica-magnesia-zirconia. The matrix may be in the form of a cogel. The relative proportions of zeolite components and inorganic oxide gel matrix may vary widely with the zeolite content ranging from between about 1 to about 99 percent by weight and more usually in the range of about 5 to about 80 percent by weight of composite.

DRY GAS CONVERSION TO GASOLINE

The steps involved in converting the methane rich dry gas portion of the wet natural gas feed to aromatic gasoline are well known. The individual steps of steam reforming the $C_1/C_2$ dry gas fraction to carbon monoxide and hydrogen, the conversion of the synthesis gas to methanol over a copper-containing catalyst and the conversion of the methanol to aromatic gasoline over ZSM-5 type catalysts have been described in detail above.

THERMAL CRACKING OF $C_3^+$ PARAFFIN RICH FRACTION

The $C_3^+$ paraffin rich fraction separated from the wet natural gas feed is processed separately from the dry gas portion and is converted to a product comprising a wide slate of transportation fuels and lubricating oils. In the first stage of conversion, the paraffin rich fraction is subjected to thermal cracking to reduce the molecular weight of the fraction and form an olefinic product comprising about 40 to 75 percent olefins by weight.

A typical composition of a $C_3^+$ paraffin rich fraction separated from wet natural gas and fed to the thermal cracking reactor is shown in Table 1.

TABLE 1

| Composition of Separated $C_3^+$ Fraction of Wet Natural Gas | |
|---|---|
|  | Wt. % |
| Propane | 22.2 |
| n-Butane | 6.5 |
| Isobutane | 10.6 |
| n-Pentane | 6.1 |
| Isopentane | 5.1 |
| $C_6^+$ Paraffins | 49.5 |
|  | 100.0 |

The $C_3^+$ paraffin rich fraction comprises about 2 to about 50 weight percent of the wet natural gas feed.

Thermal cracking to the olefinic product is carried out at a temperature in the range of about 1400° to 1700° F., at a pressure of 0 to 30 psig and a rsidence time which does not exceed one second. A typical product distribution from the thermal cracking unit is shown in Table 2.

TABLE 2

| Product Distribution From Thermal Cracking Reactor | |
|---|---|
|  | Wt. % |
| Hydrogen | 0.5 |
| Methane | 15.0 |
| Ethane | 7.5 |
| Ethylene | 38.5 |
| Propane | 10.0 |
| Propene | 15.0 |
| Butanes + Butenes | 4.0 |
| Aromatics | 9.0 |
| Other | 0.5 |
|  | 100.0 |

An alternative to thermal cracking the paraffin rich fraction to olefins is catalytic dehydrogenation of the $C_3^+$ alkanes contained in the separated paraffin rich fraction. Commercial processes such as Houdry's "Catofin" Process, Air Products and Chemicals Inc., Allentown, Pa., and the "Catalytic Dehydrogenation" process of UOP, Des Plaines, Ill. are two processes which are applicable in the integrated process of the present invention. Such catalytic dehydrogenation processes take place at temperatures and pressures similar to thermal cracking to olefins, 1000° to 1700° F. and pressures ranging from about 0.1 to 2 atmospheres. Catalytic dehydrogenation is more selective to the formation of $C_3+$ olefins than thermal processing which yields large amounts of ethylene.

CATALYTIC CONVERSION TO GASOLINE AND DISTILLATE

The olefinic product from the thermal cracking unit is separated into a $C_3+$ fraction and a $C_1/C_2$ fraction. The light fraction may be mixed with the dry gas portion of the wet natural gas feed and fed to the steam reforming unit. Alternatively, the ethane and ethylene components of the product from thermal cracking may be included with the $C_3+$ fraction for catalytic conversion of the olefins to gasoline and distillate boiling-range hydrocarbons. The $C_2+$ or $C_3+$ portion of the olefinic product from the thermal cracking unit is passed over a zeolite catalyst such as described above. The preferred catalyst is HZSM-5. The catalytic conversion of the product from the thermal reactor takes place at a temperature ranging from abut 350° to 600° F., at a pressure of about 100 to 3000 psig and a space velocity of about 0.1 to 5 WHSV.

The conversion of olefins to gasoline and distillate boiling-range hydrocarbons is more fully described in U.S. Pat. Nos. 4,150,062 and 4,227,992, assigned to Mobil Oil Corporation and the disclosures of which are herein incorporated by reference.

Conversion of the olefinic portion of the change is typically greater than 90 percent. The liquid product boiling below about 330° F. is flashed off. This product comprises about 10 to 30 weight percent of the charge olefins and has an octane number (R+O) of greater than 90.

HYDROGENATION OF DISTILLATE

The 330° F.+ liquid product obtained from the catalytic conversion of the thermal cracking olefin product over ZSM-5 is subjected to hydrogenation to stabilize this distillate fraction by saturation of olefins and diolefins and to increase the cetane value of the distillate. Excess hydrogen formed in the steam reforming reactor may be used as the hydrogen source. Hydrogenation is a catalytic process in which a Pt or Pd supported catalyst which does not require the addition of sulfur to maintain activity is preferred. Such a catalyst produces sulfur-free products unlike Co/Mo/Al or Ni/W/Al catalysts. A typical catalyst is 0.4 Pt or gamma-alumina. Saturation of the olefinic double bond is essentially complete under hydrogenation conditions of 550° to 700° F., a pressure of 100 to 500 psig and a space velocity of 0.5 to 5 LHSV and a hydrogen volume rate of 1000 to 5000 SCF/bbl. Typical yields and properties of the products from hydrogenation and separation by distillation are shown in Table 3.

TABLE 3

| Distillate Products | |
|---|---|
| 330 to 500° F., Jet Fuel | Yield 10 to 30 weight percent, freeze point $< -65°$ F., Luminometer No. $>75$, Smoke Point $>25$. |
| 500 to 650° F. Diesel Fuel | Yield 10 to 50 weight percent, Pour Point $< -50°$ F., Cetane No. $>45$. |
| 650° F.+ Lube | Yield 2 to 30 percent, |

TABLE 3-continued

| Distillate Products |
|---|
| Pour Point $< -20°$ F., V. I. $>90$. |

As can be readily ascertained the present invention greatly expands previous synthetic fuel production of gasoline from natural gas to a wide slate of transportation fuels and lubricating oils. Additionally, the ethylene and aromatic fractions produced in the thermal cracking unit can be separated for petrochemical use and thereby improve the quality of the distillate produced from the conversion of the thermal cracking product over the zeolite catalyst.

What is claimed is:

1. A process for manufacturing a wide slate of synthetic fuels and petrochemicals from wet natural gas comprising; separating wet natural gas into a dry gas fraction consisting essentially of methane and ethane and a $C_3+$ paraffin rich fraction, converting said dry gas fraction to a synthesis gas comprising carbon monoxide and hydrogen, converting said synthesis gas to gasoline-boiling hydrocarbons, converting said paraffin rich fraction to yield a lower molecular weight product having higher olefin content than said paraffin rich fraction, separating said lower molecular weight product into a $C_1/C_2$ hydrocarbon fraction and olefinic fraction, mixing said $C_1/C_2$ fraction with said dry gas fraction to form synthesis gas, converting said olefinic fraction to a wide range of transportation fuels and lubricating oils by contacting said product with a crystalline aluminosilicate catalyst having a silica to alumina mole ratio of at least 12 and a constraint index within the range of about 1 to 12.

2. The process of claim 1 wherein said synthesis gas is produced from said dry gas fraction by contacting said dry gas fraction with steam in the presence of a nickel-containing catalyst.

3. The process of claim 2 wherein said synthesis gas is converted to methanol by contacting said synthesis gas with a methanol synthesis catalyst, said methanol being converted to a gasoline product by contacting said methanol with a crystalline aluminosilicate catalyst having a silica to alumina mole ratio of at least about 12 and a constraint index within the range of about 1 to 12.

4. The process of claim 1 wherein said paraffin rich fraction is converted by thermally cracking said paraffin rich fraction without a catalyst.

5. The process of claim 1 wherein said paraffin rich fraction is converted by catalytically dehydrogenating the alkane content of said paraffin rich fraction.

6. The process of claim 1 wherein methane is separated from said lower molecular weight product, said separated methane being combined with said dry gas fraction which is converted to synthesis gas, and wherein said olefin fraction comprises $C_2+$ hydrocarbon.

7. The process of claim 1 wherein methane is separated from said lower molecular weight product and mixed with said dry gas fraction to produce said synthesis gas and a fraction of the hydrogen from said synthesis gas is used to hydrogenate said distillate fraction from said catalytic conversion.

8. A process for manufacturing a wide slate of synthetic fuels and petrochemicals from wet natural gas comprising; separating wet natural gas into a dry gas fraction consisting essentially of methane and ethane and a $C_3^+$ paraffin rich fraction, converting said dry gas fraction to a synthesis gas comprising carbon monoxide and hydrogen, converting said synthesis gas to gasoline-boiling hydrocarbons, converting said paraffin rich fraction to yield a lower molecular weight product having higher olefin content than said paraffin rich fraction, converting said lower molecular weight product to a wide range of transportation fuels and lubricating oils by contacting said product with a crystalline aluminosilicate catalyst having a silica to alumina mole ratio of at least 12 and a constraint index within the range of about 1 to 12, said lower molecular weight product being converted over said catalyst to an olefinic gasoline boiling below about 330° F. and a distillate fraction boiling above about 330+ F. by contacting said product with said catalyst at a temperature ranging from about 350° to 600° F., at a pressure of about 100 to 3000 psig and a space velocity of 0.1 to 5 WHSV, said distillate fraction being hydrogenated with a portion of the hydrogen from said synthesis gas in the presence of a catalyst under conditions of temperature within the range of about 550° to 700° F., a pressure of 100 to 500 psig and a space velocity of 0.5 to 5 LHSV and a hydrogen volume rate of 1000 to 5000 SCF/bbl.

9. The process of claim 8 wherein said hydrogenated distillate fraction is separated into a jet fuel fraction having a boiling range of about 330° to 500° F., a diesel fuel fraction having a boiling range of about 500° to 650° F. and a lubricating oil fraction boiling above 650° F.

10. A process for making heavier hydrocarbon products from wet natural gas comprising the steps of:
separating wet natural gas into a dry gas fraction consisting essentially of methane and ethane and a $C_3^+$ paraffin rich fraction;
converting the dry gas fraction to a synthesis gas comprising carbon monoxide and hydrogen;
cracking the $C_3^+$ fraction to yield an olefinic product comprising a $C_3^+$ olefinic fraction and a $C_1/C_2$ hydrocarbon fraction;
separating at least a portion of the $C_1/C_2$ hydrocarbon fraction and mixing same with the dry gas fraction for conversion to synthesis gas;
contacting at least a portion of the $C_3^+$ olefinic fraction with ZSM-5 type catalyst for conversion of $C_3^+$ olefin to heavier hydrocarbons comprising olefinic gasoline and distillate hydrocarbons;
hydrogenating heavier distillate hydrocarbons with a fraction of hydrogen from the synthesis gas; and
converting synthesis gas to gasoline hydrocarbons.

* * * * *

UNITED STATES PATENT AND TRADEMARK OFFICE
CERTIFICATE OF CORRECTION

PATENT NO. : 4,413,153
DATED : November 1, 1983
INVENTOR(S) : W.E. Garwood and W. Lee It is certified that error appears in the above—identified patent and that said Letters Patent is hereby corrected as shown below:

Column 1, line 52, delete "extend" and insert --extent--.

Column 3, line 30, before "gas fractions" insert --The individual conversions of the separated natural--.

Column 5, line 32, delete "crcking" and insert --cracking--.

Column 8, line 43, delete "rsidence" and insert --residence--.

Column 9, line 33, delete "change" and insert --charge--.

Column 11, line 15, delete "330$_+$F" and insert --330°F--.

Signed and Sealed this

Second Day of April 1985

[SEAL]

Attest:

DONALD J. QUIGG

Attesting Officer   Acting Commissioner of Patents and Trademarks